United States Patent Office 2,994,596
Patented Aug. 1, 1961

2,994,596
HYDROCARBON LIQUIDS INHIBITED AGAINST CORROSION
Aaron Sterlin, Chicago, Ill., assignor to Nalco Chemical Company, a corporation of Delaware
No Drawing. Filed Oct. 24, 1956, Ser. No. 617,932
19 Claims. (Cl. 44—63)

This invention relates to hydrocarbon liquids inhibited against corrosion and more particularly gasoline, diesel fuel and furnace oils.

The present application is directed toward subject matter which was required to be divided from my application Serial No. 280,197, filed April 2, 1952, and is a continuation-in-part of said application, now U.S. Patent No. 2,773,879.

Various attempts have been made to inhibit corrosion of metals in contact with hydrocarbon liquids such as gasoline and other hydrocarbon fuels where the tendency to cause such corrosion has been due to the presence of small amounts of water. In many cases, even though a particular chemical is effective in inhibiting corrosion the amount required may be so large as to cause other adverse or harmful effects. For example, in gasoline the presence of a corrosion inhibitor may cause gum formation.

One of the objects of the present invention is to provide a hydrocarbon liquid which is inhibited against corrosion by the presence of a very small amount of an in-inhibiting agent which does not otherwise adversely affect the properties of said hydrocarbon liquid.

A further object of this invention is to provide gasoline containing an additive which inhibits the gasoline against corrosion.

Another object is to provide new and improved diesel fuel oils which are inhibited against corrosion. Other objects will appear hereinafter.

In accomplishing these objects in accordance with the invention there is incorporated with a hydrocarbon liquid a salt, or a mixture of salts, of an organic aliphatic dicarboxylic acid containing at least 10 carbon atoms in a hydrocarbon structure and a glyoxalidine wherein the carbon atom in the 2-position is linked to a higher aliphatic hydrocarbon group containing at least 8 carbon atoms, the carbon atom in the 4-position is linked to a member from the group consisting of hydrogen and lower aliphatic hydrocarbon groups containing not more than 6 carbon atoms, the carbon atom in the 5-position is linked to a member from the group consisting of hydrogen and lower aliphatic hydrocarbon groups containing not more than 6 carbon atoms, there being at least one hydrogen atom on each of the carbon atoms in the 4- and 5-positions, and the nitrogen atom in the 1-position is linked to a member from the group consisting of hydrogen and lower aliphatic groups containing not more than 6 carbon atoms, said last named lower aliphatic groups being composed of atoms from the group consisting of hydrogen, carbon, nitrogen and oxygen.

The organic aliphatic dicarboxylic acid employed in the preparation of the aforesaid salt or mixtures of salts preferably contains 10 to 36 carbon atoms and especially good results have been obtained with organic aliphatic dicarboxylic acids containing about 34 to 36 carbon atoms.

The inhibiting compounds can also be characterized as monoglyoxalidine salts of said organic aliphatic dicarboxylic acids or diglyoxalidine salts of such acids, depending upon whether one or two mols of the glyoxalidine is reacted with the organic aliphatic dicarboxylic acid. If only one mol of the glyoxalidine is reacted the resultant compound is a monoamine salt containing a free carboxylic acid group. If two mols of the glyoxalidine are reacted the resultant compound is a diamine salt. The glyoxalidines employed as starting materials are made by well known procedures by reacting a fatty acid with an aliphatic polyamine with the elimination of water as described, for example, in Wilson, U.S. Patent 2,267,965, and Wilkes et al., U.S. Patent 2,268,273.

The glyoxalidines with which the present invention is particularly concerned are those in which the glyoxalidine portion of the molecule is derived by reacting together one of the acids from the group consisting of lauric acid, myristic acid, palmitic acid, oleic acid and stearic acid, with an aliphatic polyamine from the group consisting of aminoethylethanolamine, diethylenetriamine and triethylenetetramine. When the glyoxalidine is derived from aminoethylethanolamine the resultant product contains a hydroxyethyl group in the 1-position. When the glyoxalidine is derived from diethylenetriamine the resultant product contains an aminoethyl group in the 1-position, and when the glyoxalidine is derived from triethylenetetramine the resultant product contains a (2-aminoethyl)-aminoethyl group in the 1-position.

The number of carbon atoms in the aliphatic hydrocarbon group in the 2-position is always one less than in the aliphatic carboxylic acid from which the glyoxalidine is derived. Thus, if the glyoxalidine is made from lauric acid the hydrocarbon group in the 2-position will contain 11 carbon atoms. If the glyoxalidine is made from oleic acid the hydrocarbon group in the 2-position will be a heptadecenyl group containing 17 carbon atoms. The hydrocarbon group in the 2-position preferably contains 13 to 17 carbon atoms for the purpose of the present invention.

Specific examples of glyoxalidines that can be reacted with sebacic acid, dilinoleic acid and other long chain organic aliphatic dicarboxylic acids in preparing salts suitable for the purpose of the invention are:

1-(2-hydroxyethyl)-2-undecyl glyoxalidine,
1-(2-hydroxyethyl)-2-tridecyl glyoxalidine,
1-(2-hydroxyethyl)-2-pentadecyl glyoxalidine,
1-(2-hydroxyethyl)-2-heptadecyl glyoxaldidine,
1-(2-hydroxyethyl)-2-heptadecenyl glyoxalidine,
1-(2-aminoethyl)-2-undecyl glyoxalidine,
1-(2-aminoethyl)-2-tridecyl glyoxalidine,
1-(2-aminoethyl)-2-pentadecyl glyoxalidine,
1-(2-aminoethyl)-2-heptadecyl glyoxalidine,
1-(2-aminoethyl)-2-heptadecenyl glyoxalidine,
1-[(2-aminoethyl)-aminoethyl]-2-undecyl glyoxalidine,
1-[(2-aminoethyl)-aminoethyl]-2-tridecyl glyoxalidine,
1-[(2-aminoethyl)-aminoethyl]-2-pentadecyl glyoxalidine,
1-[(2-aminoethyl)-aminoethyl]-2-heptadecyl glyoxalidine,
1-[(2-aminoethyl)-aminoethyl]-2-heptadecenyl glyoxalidine,
4-methyl-2-undecyl glyoxalidine,
4-methyl-2-tridecyl glyoxalidine,
4-methyl-2-pentadecyl glyoxalidine,
4-methyl-2-heptadecyl glyoxalidine,
4-methyl-2-heptadecenyl glyoxalidine.

The organic aliphatic dicarboxylic acid salts are prepared by mixing a glyoxalidine of the type described and an organic aliphatic dicarboxylic acid of the type described in mol ratios of 1:1 in case it is desired to prepare the monoamine salt, or 2:1 in case it is desired to prepare the diamine salt, and warming the reaction mixture at temperatures sufficient to melt the dicarboxylic acid if it is a solid for 5 to 15 minutes with or without a catalyst until homogeneous materials are obtained.

In the practice of the invention it has been found that especially good results in inhibiting corrosion in gasoline containing water have been obtained by employing as the corrosion inhibiting agent the reaction products of sebacic acid and 1-(2-hydroxyethyl)-2-heptadecenyl glyoxalidine.

Especially good results have been obtained with the reaction product derived by reacting two mols of said glyoxalidine with one mol of sebacic acid. Excellent results have also been obtained by employing as the gasoline additive the product obtained by bringing together a polymer acid containing approximately two carboxy groups and 34 to 36 carbon atoms and 1-(2-hydroxyethyl)-2-heptadecenyl glyoxalidine in approximately equal weight proportions.

In order to evaluate the invention tests were made in hydrocarbon fuels to which water had been added.

The organic aliphatic dicarboxylic acid salt of the glyoxalidine of the type previously described was prepared for use as a 10% by weight concentrate in a suitable solvent.

The test specimens were hot rolled mild steel rods ¼ x 2¾" of which a 2¼" length was polished with No. 3/0 emery cloth.

The test medium, for example, gasoline, was placed in a 25 x 150 mm. screw cap tube. To 40 ml. of the test medium were added first the inhibitor solution previously described and after mild agitation 10% by volume of distilled water which had been equilibrated with air. The capped tube was then mechanically agitated at room temperature (75° F.) for six hours by end over end tumbling.

The test solution was then transferred to a numbered 25 x 150 mm. test tube and the water and hydrocarbon phases were permitted to separate. The test specimen was inserted in the tube so that a part exposed to the lower phase (water) without contacting any part of the container. The tube was not disturbed for the 72-hour test duration.

Other tests were set up as described above with selected materials in which 1% water instead of 10% was used.

After completion of the test the specimen was removed, rinsed with acetone and air dried. It was then evaluated on the extent of visible corrosion. Each test was made in duplicate. If both specimens were not visibly corroded the material was classed as effective and if both appeared to be corroded the material was called ineffective. Wherever one of the pairs was uncorroded and the other corroded the test was repeated. If, after retesting, either specimen was corroded the material was judged to be ineffective at the tested concentration. This criterion is identical with that used in ASTM D665-49T.

The following examples illustrate some of the results obtained when compositions falling within the scope of the invention were evaluated in the manner just described.

*Example I*

The sebacic acid salt derived by reacting two mols of 1-(2-hydroxyethyl)-2-heptadecenyl glyoxalidine with one mol of sebacic acid at a temperature of about 133° C. for about 5 to 15 minutes when tested under the foregoing conditions in Standard Red Crown gasoline to which 10% distilled water had been added was effective in inhibiting corrosion of the test specimens at concentrations of 10 parts of said amine salt per million parts of gasoline in a series of six tests.

In a series of three tests at a concentration of 25 parts per million the said glyoxalidine sebacic acid salt completely inhibited corrosion under the test conditions described.

In a series of six tests at a concentration of 5 parts per million in said gasoline under the same test conditions there was slight to moderate corrosion of the test specimens.

*Example II*

When the same corrosion inhibiting composition was tested under agitated conditions according to ASTM method D-655-49T using room temperature instead of 140° F. and strips of SAE-1018 steel instead of SAE-1020 or SAE-1025 steel the aforesaid diglyoxalidine sebacic acid salt was effective in preventing corrosion at a concentration of 0.31 part per million in the gasoline.

*Example III*

Under the same test conditions as in Example II at a concentration of 0.16 part per million in the gasoline slight corrosion of the test specimens was obtained. At a concentration of 0.08 part per million heavy corrosion was obtained. Thus, the effective minimum amount in inhibiting corrosion in gasoline with said composition under agitated conditions is around 0.3 part per million and under static conditions around 5 to 10 parts per million.

*Example IV*

Results similar to those in Example I were obtained with the reaction product derived by reacting one mol of 1-(2-hydroxyethyl)-2-heptadecenyl glyoxalidine with one mol of sebacic acid at a temperature of about 133° C. for about 5 to 15 minutes.

*Example V*

The monoamine salt of a dimer acid was prepared by heating together at a temperature up to 100° F. equimolecular proportions of 1-(2-hydroxyethyl)-2-heptadecenyl glyoxalidine and a dimer acid containing about 85% by weight of dilinoleic acid. This product was effective in inhibiting corrosion in a gasoline-water system under the test conditions previously described at a concentration of 25 parts per million.

*Example VI*

The reaction product was prepared by reacting together two mols of 1-(2-hydroxyethyl)-2-heptadecenyl glyoxalidine and one mol of a dimer acid containing about 85% by weight dilinoleic acid. This product was effective in inhibiting corrosion in a gasoline-water system when tested according to the static corrosion test previously described at a concentration of 25 parts per million.

The solvent which is used to dissolve the active effective ingredient is subject to some variation depending upon the solubility characteristics of the particular compound employed. In some cases, even though the corrosion inhibiting compound is insoluble in a particular solvent it will dissolve in a combination of solvents. For instance, the compound tested in Example I is soluble in 100% denatured ethyl alcohol, soluble in Indocene 90 (a petroleum fraction high in aromatic compounds and naphthenes) soluble in 99% isopropanol, insoluble in virgin gas oil and soluble in xylene. This product dissolves satisfactorily in a mixture of xylene and naphtha. As an illustration, where the corrosion inhibiting ingredient is to be added to gasoline a suitable concentrate has the following composition:

| Ingredients: | Weight percent |
|---|---|
| Sebacic acid salt of Example I | 12 |
| Xylene | 35 |
| Naphtha (flash point 80° to 105° F.) | 53 |

Similarly other compositions can be prepared using suitable solvents.

It will be understood that the effective corrosion inhibiting ingredient can be added directly to the hydrocarbon liquid provided it is soluble therein. However, the amounts required are so small that it is preferable to prepare a solution of the active ingredient containing about 5 to about 15% thereof, the remainder being a suitable solvent which dissolves the corrosion inhibiting ingredient and is miscible with the medium to which the solution is to be added.

It will be understood that some variations can be made in the preparation of the corrosion inhibiting chemicals and in the procedures employed in using such chemicals. As examples of other long chain aliphatic dicarboxylic acids which can be reacted with any of the glyoxalidines previously described there may be mentioned the acids known in the trade as VR fatty acid and VR–1 acid. VR fatty acid is an organic carboxy acid material which is a vegetable residue resulting from the distillation of soap stock. This material contains ester bodies and has the following characteristics:

| | |
|---|---|
| Acid value | 45 |
| Saponification value | 150 |
| Iodine value | 100 |
| Color (Bartlett) | 13 |
| Viscosity (Zahn $G_5$ at 75° C.) seconds | 15 |

VR–1 acid is a mixture of polybasic acids with an average molecular weight of about 1000. It has an average of slightly less than two carboxylic acid groups per molecule. It is a by-product from the production of sebacic acid by the caustic fusion of castor oil, consists principally of polymerized linoleic acid, contains dimerized, trimerized and higher polymerized linoleic acid, and is a dark amber, rather viscous liquid. A typical sample of VR–1 acid has the following analysis:

| | |
|---|---|
| Acid number | 150 |
| Iodine number | 36 |
| Saponification number | 172 |
| Unsaponifiable matter percent | 3.7, 3.5 |
| Moisture content do | 0.86 |

One of the important advantages of the present invention is that the addition of the compositions herein described to gasoline in the quantities which are effective in inhibiting corrosion has no adverse effects such as gum formation. In actual tests using a corrosion inhibiting composition consisting of 12% by weight of the product obtained by reacting two mols of 1-(2-hydroxyethyl)-2-heptadecenyl glyoxalidine with one mol of sebacic acid, 35% by weight xylene and 53% by weight of naphtha, there was a decrease in gum formation in the gasoline from 2.8 mg. per 100 ml. to 1.0 mg. per 100 ml. at a concentration of 10 parts of the corrosion inhibiting chemical (84 parts of the solvent solution of said chemical) per million parts by weight of gasoline.

The invention is further illustrated by the following example.

*Example VII*

A composition was prepared having the following formula:

| Ingredients: | Percent by weight |
|---|---|
| Century D–75 acids [1] | 25 |
| 1-(2-hydroxyethyl)-2-heptadecenyl glyoxalidine | 25 |
| Bronoco Hi-Sol | 50 |

[1] This is a mixture of polymer acids containing approximately two carboxylic acid groups per molecule and having properties generally similar to VR–1 acid previously described.

The above described corrosion inhibiting composition was mixed with various types of hydrocarbon liquids and tested in the presence of waters containing both high dissolved solids and low dissolved solids. The tests used were adapted to simulate static conditions such as those that are present when hydrocarbon liquids are stored and also adapted to simulate agitated conditions such as those that are present when hydrocarbon liquids are transported in pipelines, tankers and tank trucks. Using ASTM test D–665–52T known as the "turbine oil rusting test" at 75° F., a concentration of 25 parts per million of the corrosion inhibiting composition was effective in preventing corrosion in Standard Red Crown gasoline, Shell 115–145 octane aviation gasoline, Shell 100–130 octane aviation gasoline, Sinclair 100–130 octane aviation gasoline and Stanolind No. 2 high speed diesel fuel oil. Since this test involves the use of synthetic sea water the results indicate particularly the value of the invention in ocean going tankers where rusting due to the presence of sea water is a problem.

In static tests carried out in the manner previously described herein in the presence of deionized water 25 parts per million of this corrosion inhibiting composition were also effective in inhibiting corrosion in Standard Red Crown gasoline and the three types of aviation gasoline described above.

In general, depending upon the particular hydrocarbon liquid, the quantity of the active salt of the organic aliphatic dicarboxylic acid employed for the purpose of the invention may vary from a fraction of a part per million as shown by Examples II and III to 1000 parts per million. However, it will be recognized that it is desirable to use as small a quantity of the corrosion inhibiting composition as will be effective to accomplish the purpose and in most instances good results are obtained with proportions within the range of ½ to 25 parts of the glyoxalidine salt per million parts of hydrocarbon liquid.

The term "glyoxalidine" refers to a compound having the following structural formula

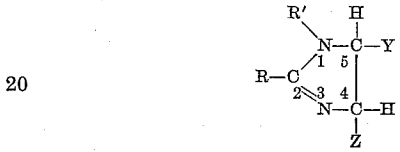

wherein R is an aliphatic hydrocarbon radical; R', Y and Z are either hydrogen or an aliphatic group, it being understood that for the purpose of the present invention R, R', Y and Z are further restricted in the manner previously described. It should also be noted that in the preferred compounds of the present invention R is composed of carbon and hydrogen atoms, Y and Z are either hydrogen or groups consisting of carbon and hydrogen, and R' is either hydrogen, a group consisting of carbon and hydrogen, a group consisting of carbon, hydrogen and nitrogen, or a group consisting of carbon, hydrogen and oxygen. In other words, in the preferred compounds with respect to R' the atoms in the group are selected from the group consisting of hydrogen, carbon, nitrogen and oxygen.

The invention is hereby claimed as follows:

1. A hydrocarbon liquid containing water normally tending to cause corrosion of ferrous metals, said liquid containing a corrosion inhibiting amount of salt of an organic aliphatic dicarboxylic acid containing at least 10 carbon atoms in a hydrocarbon structure and a glyoxalidine wherein the carbon atom in the 2-position is linked to a higher aliphatic hydrocarbon group containing at least 8 carbon atoms, the carbon atom in the 4-position is linked to a member from the group consisting of hydrogen and lower aliphatic hydrocarbon groups containing not more than 6 carbon atoms, the carbon atom in the 5-position is linked to a member from the group consisting of hydrogen and lower aliphatic hydrocarbon groups containing not more than 6 carbon atoms, there being at least one hydrogen atom on each of the carbon atoms in the 4- and 5-positions, and the nitrogen atom in the 1-position is linked to a member from the group consisting of hydrogen and lower aliphatic groups containing not more than 6 carbon atoms, said last named lower aliphatic groups being composed of atoms from the group consisting of hydrogen, carbon, nitrogen and oxygen.

2. Gasoline containing water normally tending to cause corrosion of ferrous metals, said gasoline containing a corrosion inhibiting amount of a salt of an organic aliphatic dicarboxylic acid containing at least 10 carbon atoms in a hydrocarbon structure and a glyoxalidine wherein the carbon atom in the 2-position is linked to a higher aliphatic hydrocarbon group containing at least 8 carbon atoms, the carbon atom in the 4-position is linked to a member from the group consisting of hydrogen and lower aliphatic hydrocarbon groups containing not more than 6 carbon atoms, the carbon atom in the 5-position is linked to a member from the group consisting of hydrogen and lower aliphatic hydrocarbon groups containing not more than 6 carbon atoms, there being at least one hydrogen atom on each of the carbon atoms in the 4- and 5-positions, and the nitrogen atom in the 1-position is linked to a member from the group consisting of hydrogen and lower aliphatic groups containing not more than 6 carbon atoms, said last named lower aliphatic groups being composed of atoms from the group consisting of hydrogen, carbon, nitrogen and oxygen.

3. A diesel fuel oil containing water normally tending to cause corrosion of ferrous metals, said oil containing a corrosion inhibiting amount of a salt of an organic aliphatic dicarboxylic acid containing at least 10 carbon atoms in a hydrocarbon structure and a glyoxalidine wherein the carbon atom in the 2-position is linked to a higher aliphatic hydrocarbon group containing at least 8 carbon atoms, the carbon atom in the 4-position is linked to a member from the group consisting of hydrogen and lower aliphatic hydrocarbon groups containing not more than 6 carbon atoms, the carbon atom in the 5-position is linked to a member from the group consisting of hydrogen and lower aliphatic hydrocarbon groups containing not more than 6 carbon atoms, there being at least one hydrogen atom on each of the carbon atoms in the 4- and 5-positions, and the nitrogen atom in the 1-position is linked to a member from the group consisting of hydrogen and lower aliphatic groups containing not more than 6 carbon atoms, said last named lower aliphatic groups being composed of atoms from the group consisting of hydrogen, carbon, nitrogen and oxygen.

4. A hydrocarbon liquid containing water normally tending to cause corrosion of ferrous metals, said liquid containing a corrosion inhibiting amount of a sebacic acid salt of 1-(2-hydroxyethyl)-2-heptadecenyl glyoxalidine.

5. A hydrocarbon liquid containing water normally tending to cause corrosion of ferrous metals, said liquid containing a corrosion inhibiting amount of a glyoxalidine salt of 1-(2-hydroxyethyl)-2-heptadecenyl glyoxalidine and a polymerized fatty acid containing about 34 to 36 carbon atoms.

6. A hydrocarbon liquid containing water normally tending to cause corrosion of ferrous metals, said liquid containing a corrosion inhibiting amount of a glyoxalidine salt of 1-(2-hydroxyethyl)-2-heptadecenyl glyoxalidine and a polymerized linoleic acid.

7. A hydrocarbon liquid containing water normally tending to cause corrosion of ferrous metals, said liquid containing a corrosion inhibiting amount of a glyoxalidine salt of 1-(2-hydroxyethyl)-2-heptadecenyl glyoxalidine and dilinoleic acid.

8. Gasoline containing water normally tending to cause corrosion of ferrous metals, said gasoline containing a corrosion inhibiting amount of a glyoxalidine salt of 1-(2-hydroxyethyl)-2-heptadecenyl glyoxalidine and a polymerized fatty acid containing about 34 to 36 carbon atoms.

9. Gasoline containing water normally tending to cause corrosion of ferrous metals, said gasoline containing a corrosion inhibiting amount of a glyoxalidine salt of 1-(2-hydroxyethyl)-2-heptadecenyl glyoxalidine and a polymerized linoleic acid.

10. Gasoline containing water normally tending to cause corrosion of ferrous metals, said gasoline containing a corrosion inhibiting amount of a glyoxalidine salt of 1-(2-hydroxyethyl)-2-heptadecenyl glyoxalidine and dilinoleic acid.

11. A hydrocarbon liquid containing water which is normally corrosive to iron, said liquid containing from 0.16 part per million to 1,000 parts per million of a salt of an organic dicarboxylic acid in which the carboxy groups are connected to an aliphatic hydrocarbon structure so that said acid contains 10 to 36 carbon atoms and a glyoxalidine wherein the carbon atom in the 2-position is linked to a higher aliphatic hydrocarbon group containing 8 to 17 carbon atoms, the carbon atom in the 4-position is linked to a member from the group consisting of hydrogen and lower aliphatic hydrocarbon groups containing not more than 6 carbon atoms, the carbon atom in the 5-position is linked to a member from the group consisting of hydrogen and lower aliphatic hydrocarbon groups containing not more than 6 carbon atoms, there being at least one hydrogen atom on each of the carbon atoms in the 4- and 5-positions and the nitrogen atom in the 1-position being linked to a member from the group consisting of hydrogen and lower aliphatic groups containing not more than 6 carbon atoms, said last named lower aliphatic groups being composed of atoms from the group consisting of hydrogen, carbon, nitrogen and oxygen.

12. Gasoline containing water normally tending to cause corrosion of ferrous metals, said gasoline containing from 0.16 part per million to 1,000 parts per million of a salt of 1-(2-hydroxyethyl)-2-heptadecenyl glyoxalidine and an organic aliphatic dicarboxylic acid in which the carboxy groups are connected to an aliphatic hydrocarbon structure so that said acid contains 10 to 36 carbon atoms and the molar ratio of said glyoxalidine to said acid is approximately 2:1.

13. Gasoline as claimed in claim 12 in which said acid is sebacic acid.

14. Gasoline as claimed in claim 12 in which said acid is a polymerized fatty acid.

15. Gasoline as claimed in claim 12 in which said acid is a polymerized linoleic acid.

16. A hydrocarbon distillate fuel oil containing water normally tending to cause corrosion of ferrous metals, said oil containing from 0.16 part per million to 1,000 parts per million of a salt of 1-(2-hydroxyethyl)-2-heptadecenyl glyoxalidine and an organic aliphatic dicarboxylic acid in which the carboxy groups are connected to an aliphatic hydrocarbon structure so that said acid contains 10 to 36 carbon atoms and the molar ratio of said glyoxalidine to said acid is approximately 2:1.

17. A hydrocarbon distillate fuel oil as claimed in claim 16 in which said acid is sebacic acid.

18. A hydrocarbon distillate fuel oil as claimed in claim 16 in which said acid is a polymerized fatty acid.

19. A hydrocarbon distillate fuel oil as claimed in claim 16 in which said acid is a polymerized linoleic acid.

References Cited in the file of this patent

UNITED STATES PATENTS

| | | |
|---|---|---|
| Re. 23,227 | Blair et al. | May 9, 1950 |
| 2,550,982 | Eberz | May 1, 1951 |
| 2,553,183 | Caron et al. | May 15, 1951 |
| 2,632,695 | Landis et al. | Mar. 24, 1953 |
| 2,668,100 | Luvisi | Feb. 2, 1954 |